United States Patent Office 3,795,672
Patented Mar. 5, 1974

3,795,672
PROCESS FOR THE PREPARATION OF Δ²-CEPHEM-4-CARBOXYLIC ACID ESTERS
Charles F. Murphy, Indianapolis, Ind., assignor to Eli Lilly and Company, Indianapolis, Ind.
No Drawing. Continuation-in-part of abandoned application Ser. No. 759,490, Sept. 12, 1968. This application June 9, 1971, Ser. No. 151,555
Int. Cl. C07d 99/24
U.S. Cl. 260—243 C                 8 Claims

ABSTRACT OF THE DISCLOSURE

Esters of Δ²-cephem-4-carboxylic acids are prepared from Δ³-cephem-4-carboxylic acids by first converting the Δ³ acid to the corresponding acid chloride and treating this acid with a tertiary amine base and an alcohol.

CROSS-REFERENCE

This application is a continuation-in-part of my copending application Ser. No. 759,490, filed Sept. 12, 1968, now abandoned.

BACKGROUND OF THE INVENTION

The widespread acceptance of antibiotics of the cephalosporin family has resulted in an increased interest in the chemical modification of members of this family of antibiotics in an effort to enhance their usefulness. These efforts at chemical modification are especially directed at the semi-synthetic cephalosporins obtained from penicillins in accordance with the process of Morin and Jackson (U.S. Pat. 3,275,636). The cephalosporins obtained by this process are 3-methyl-Δ³-cephem-4-carboxylic acid derivatives.

In accordance with one process for the modification of these semi-synthetic cephalosporins a bromine atom is introduced into the molecule at the 3-methyl position, followed by reaction of this active bromine compound with a nucleophilic reagent to yield 3-methyl-functionalized antibiotic. However, the 3-methyl group of a Δ³ compound cannot be directly brominated. It is first necessary to shift the Δ³ double bond to the Δ² position. Heretofore, this isomerization has been performed by treating the Δ³ compound with a base. However, this method of isomerization results in incomplete conversion of the Δ³ compound to the Δ² compounds and has not been entirely satisfactory. Therefore, there is a need for an alternative method for the conversion of a Δ³ cephalosporin compound to a Δ² cephalosporin compound.

SUMMARY

I have now discovered a method for the conversion of a Δ³-cephem-4-carboxylic acid to the corresponding Δ²-cephem-4-carboxylic acid ester. In accordance with my process the Δ³ acid is first converted to the acid chloride, which is then treated with a tertiary amine base having a pKa within the range of 7 to 11 and an ester-forming alcohol to yield the ester of the Δ² acid. The reaction is conducted at a temperature within the range of from —100° to +50° C. employing from 1 to 2 moles of the amine base and from 1 to 10 moles of the alcohol. The alcohol employed may be any ester-forming aliphatic alcohol.

DESCRIPTION OF THE PREFERRED EMBODIMENT

In accordance with my process a Δ³-cephem-4-carboxylic acid is first converted to the corresponding acid chloride. This acid chloride is then treated with from 1 to 2 moles of a tertiary amine base having a pKa within the range of 7-11 and from 1-10 moles of an ester-forming aliphatic alcohol. The series of reactions involved are depicted by the following equation:

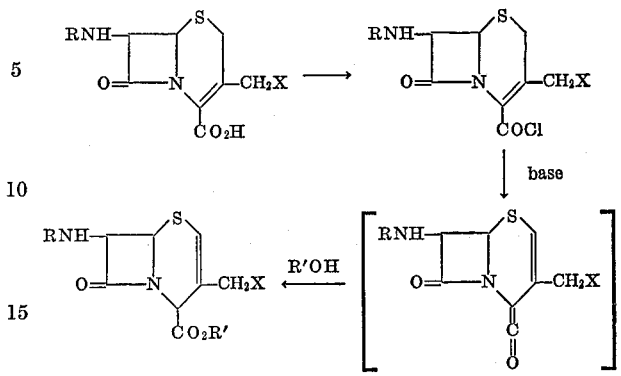

wherein X is hydrogen or acetoxy, R is an amino protecting group, and R'OH is an ester-forming alcohol, with R' being that portion of the alcohol that remains after the removal of the hydroxyl group.

In the equation I have shown an intermediate ketene. While I do not wish to be bound to any theory of the mechanism of my reaction, it is believed that the reaction does proceed through a ketene intermediate as depicted.

The starting material for my process may be any Δ³-cephem-4-carboxylic acid having the formula

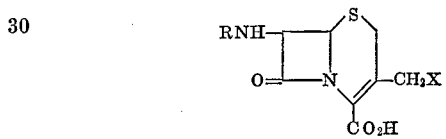

wherein R is an amino protecting group and X is hydrogen or acetoxy. Whether X is hydrogen or acetoxy will depend upon the source from which the compound is derived. If the starting compound was obtained from a penicillin by ring expansion, X will be hydrogen. If the starting material is fermentation derived, X will be acetoxy.

Amino protecting groups are well known and are described, for example, in U.S. Pats. 2,479,295 through 2,479,297, 2,562,407 through 2,562,411 and 2,623,876. Such groups as triphenylmethyl, trichloroethoxycarbonyl, benzyloxycarbonyl, t-butoxycarbonyl, and trimethylsilyl may be employed; however, the preferred amino protecting group is an acyl group of the type well known in the penicillin and cephalosporin art. Such acyl groups are described, for example, in U.S. Pats. 2,941,995, 2,951,839, 2,985,648, 2,996,501, 3,007,920, 3,025,290, 3,028,379, 3,033,047, 3,040,032, 3,041,332, 3,043,831, 3,071,575, 3,079,305, 3,080,356, 3,093,633, 3,117,119, 3,120,512–4, 3,198,804, 3,202,653–5, and 3,210,337. Specific examples of acyl blocking groups that are to be found in the penicillin and cephalosporin art are those shown below.

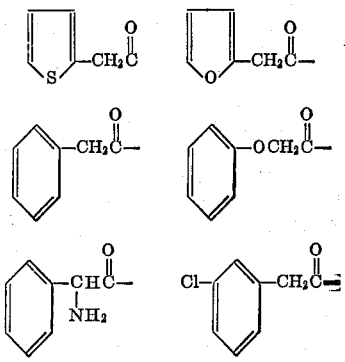

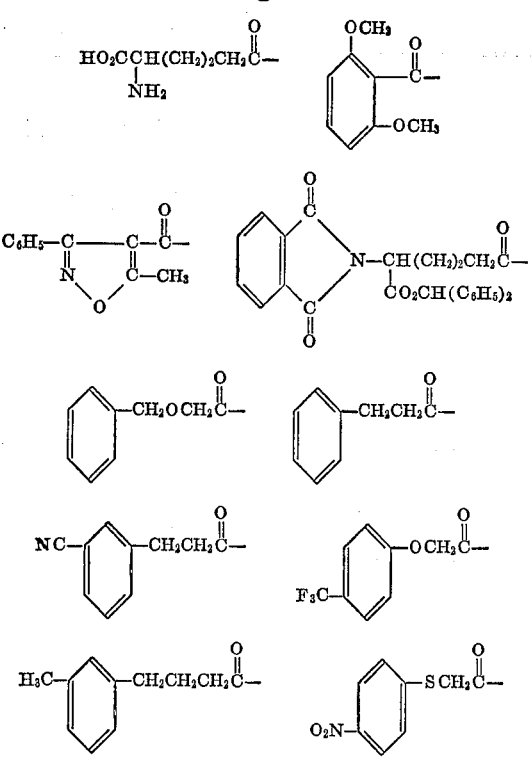

Other, less complex acyl groups may also be used. Examples of such groups include acetyl, chloroacetyl, methoxyacetyl and butyryl.

As the first step in my process a Δ³ acid as described above is converted to the acid chloride. The conversion of carboxylic acids to the corresponding acid chlorides is a well-known reaction. Reagents that may be used include phosgene, oxalyl chloride, phosphorus trichloride, phosphorus pentachloride, thionyl chloride and phosphoryl chloride. I have found that my reaction proceeds more smoothly if an anhydrous, aprotic solvent is employed. It is also preferred to use a catalytic amount of an N,N-dialkyl amide such as, for example, N,N-dimethylformamide.

The preparation of the acid chlorides will be illustrated by the following examples.

Example 1

A suspension of 0.353 g. (1.02 moles) of 7-(phenoxyacetamido)-3-methyl-Δ³-cephem-4-carboxylic acid in 40 ml. of benzene was cooled in an ice bath and stirred while 0.256 g. (2 mmole) of oxalyl chloride and 1 drop of dimethylformamide were added. The reaction mixture was stirred at about 5° C. for 45 minutes and the solvent was then removed under reduced pressure. A nuclear magnetic resonance spectrum of the acid chloride showed the absence of any Δ²-cephem isomer.

The acid chloride was characterized by conversion to the methyl ester in the following manner. The acid chloride was dissolved in methanol and the solution was stirred at 25° C. for 30 minutes. The solvent was removed under reduced pressure and the residue was dissolved in benzene. The benzene solution was washed successively with water, 3 percent hydrochloric acid, and 10 percent sodium bicarbonate solution. The benzene was then removed under reduced pressure to yield the pure Δ³-cephem-4-methylcarboxylate which crystallized from ethyl acetate with a melting point of 135°–138° C. The mixed melting point with an authentic sample of the methyl ester was 135°–137° C.

Example 2

The preparation of the acid chloride was repeated as in Example 1 using phosphorus trichloride and a catalytic amount of dimethylformamide in methylene chloride as the solvent.

Example 3

Example 1 was repeated employing phosgene with a catalytic amount of dimethylformamide in methylene chloride.

Example 4

Example 1 was repeated employing phosphorus trichloride with dimethylformamide in carbon tetrachloride solvent.

Example 5

Example 1 was repeated employing thionyl chloride with dimethylformamide in benzene.

Example 6

The acid chloride of Example 1 was prepared using phosphoryl chloride with dimethylformamide in benzene.

In the second step of my process the acid chloride is treated with a tertiary amine base having a pKa within the range of about 7–11, preferably 9–11, and an ester-forming aliphatic alcohol. Examples of tertiary amine bases that may be used include triethylamine, tributylamine, and 1,4-diazabicyclo[2.2.2]octane. Triethylamine is preferred. A skilled chemist can readily find other tertiary amine bases having pKa's within the specified range and which, therefore, would be suitable for use in my process. Best results are obtained when from 1 to 2 moles of the tertiary amine base is used with the preferred amount being 1.2 to 1.3 moles of the amine.

The alcohol to be employed is represented in the formulas by R'OH and is an aliphatic ester-forming alcohol. By aliphatic alcohol I mean an alcohol having the hydroxyl group attached to an aliphatic carbon atom. I do not mean to exclude from this definition alcohols containing aromatic ring systems so long as the hydroxyl group is attached to an aliphatic carbon atom. The alcohol may be either a primary, secondary, or tertiary alcohol. Specific examples of acceptable alcohols include aliphatic and substituted aliphatic alcohols such as methyl alcohol, ethyl alcohol, t-amyl alcohol, isopropyl alcohol, dodecyl alcohol, trichloroethyl alcohol, methoxyethyl alcohol, pinacol, adamantan-1-ol, cyclohexyl alcohol, cyclopentyl alcohol, and t-butyl alcohol; unsaturated alcohols such as 3-methyl-1-butyn-3-ol, propargyl alcohol, allyl alcohol and 3-methyl-1-buten-3-ol; alcohols containing aromatic rings such as benzyl alcohol, benzhydrol, 4-methoxybenzyl alcohol, p-nitrobenzyl alcohol, phenacyl alcohol, bis(methoxyphenyl)methyl alcohol; and amido alcohols such as phalimidomethyl alcohol and succinimidomethyl alcohol. Since the ultimate objective of my process is to obtain compounds that can be chemically modified to obtain active antibiotic compounds and since it has been found that it is the cephalosporin acids rather than the esters which exhibit antibiotic activity, the alcohol employed in my process is preferably one that can be easily removed although it is not necessary that my reaction be limited to such alcohols. The particular ester-forming alcohol chosen is not important to my process.

The carboxylic acid group of the starting cephalosporin acid is converted to ester group represented by the formula —CO₂R' wherein R' represents the portion of the alcohol molecule that remains after removal of the hydroxyl group. Thus, R' may be said to be the residue of the aliphatic ester-forming alcohol devoid of the hydroxyl group. R' represents such groups as methyl, ethyl, trichloroethyl, t-butyl, dodecyl, methoxyethyl, cyclohexyl, 3-methyl-1-butynyl, benzyl, benzhydryl, p-nitrobenzyl, phenacyl, and phthalimidomethyl.

As one might expect there is a difference in the reactivity of primary, secondary, and tertiary alcohols. As a result of this difference in reactivity I have found that the amount of alcohol which will give an optimum yield of the desired Δ² ester will vary depending upon the type of alcohol employed. In general, from 1 to 2 moles of a primary alcohol will give the best results. When a tertiary alcohol is employed it is best to use a larger excess of from about 5 to 10 moles. The optimum amount of a secondary alcohol will generally fall between that required for primary and tertiary alcohols. Thus, as a general rule from 1 to 10 moles of alcohol per mole of acid chloride will be employed with the optium amount of alcohol varying depending upon the type of alcohol used as described above. It is to be understood that more than 10 moles of the alcohol may be employed, such as when the alcohol is used as the solvent, but generally less satisfactory results are obtained.

The temperature to be employed in this step of my process will also vary depending upon the type of alcohol employed. When primary or secondary alcohols are used colder temperatures of from about −100° to −30° C. can be used. These cold temperatures prevent direct acylation to the $\Delta^3$ ester. When tertiary alcohols are employed a warmer temperature of from about −20° to +50° C. should be used. I have also found it advantageous to conduct the reaction in an anhydrous, aprotic solvent. Examples of aprotic solvents include methylene chloride, carbon tetrachloride and benzene.

The second step of my process involving the reaction of the acid chloride with the amine base and an alcohol will be further illustrated by the following examples.

Example 7

The acid chloride employed in this reaction was prepared from 44.0 g. (101 mmoles) of 7-(phenoxyacetamido)-3-methyl-$\Delta^3$-cephem-4-carboxylic acid and 24.0 g. of oxalyl chloride as described in Example 1 using 40 drops of dimethylformamide as catalyst. The acid chloride was dissolved in 1 l. of methylene chloride and added dropwise over a three-hour period to a stirred solution of 92.5 g. (1.25 mole) of t-butyl alcohol which had been freshly distilled from potassium permanganate and dried using molecular sieves, and 19.3 g. (175 mmoles) of triethylamine which had been freshly distilled from phenyl isocyanate and dried over potassium hydroxide pellets in 650 ml. of methylene chloride maintained under an anhydrous atmosphere in an ice bath. At the completion of the reaction the methylene chloride solution was washed with about 500 ml. of water followed by 100 ml. of 3 percent hydrochloric acid and evaporated to dryness. The residue was dissolved in ethyl acetate, the solution was washed successively with 10 percent sodium bicarbonate solution and water, and treated with 20 g. of activated charcoal. The mixture was then filtered and the filtrate evaporated to dryness. The residue was crystallized from ether to give the t-butyl ester of the $\Delta^2$-cephem acid in a total yield of 37.5 g. (75 percent). The product was in the form of needles which melted at 78°–80° C. From the neutral and basic washes from above was recovered 7.0 g. of a mixture of the $\Delta^2$ and $\Delta^3$ acids. The nuclear magnetic resonance spectrum of the $\Delta^2$ ester was consistent with the proposed structure.

*Analysis.*—Calculated for $C_{20}H_{24}N_2O_5S$ (percent): C, 59.40; H, 5.58; N, 6.93. Found (percent): C, 59.20; H, 6.08; N, 6.63.

Example 8

The acid chloride prepared from 0.996 g. (3.0 mmoles) of 7-(phenylacetamido)-3-methyl-$\Delta^3$-cephem-4-carboxylic acid was dissolved in 75 ml. of methylene chloride and the solution was added dropwise to a stirred solution of 2.0 g. of t-butyl alcohol and 0.40 g. of triethylamine in 30 ml. of methylene chloride maintained under anhydrous conditions at ice temperature. The addition was completed in one hour, at the end of which time the reaction mixture was washed successively with water and 3 percent hydrochloric acid and evaporated to dryness. The residue was dissolved in ethyl acetate and the solution was washed with 5 percent sodium bicarbonate solution and treated with activated charcoal. The mixture was filtered and the solvent evaporated to give 0.41 g. of product. The product was added to a column of 20 g. of deactivated silica gel (containing 15 percent water) and eluted with ethyl acetate to give 0.20 g. of product which crystallized from ether as prisms melting at 129°–130° C. A mixture of $\Delta^2$ and $\Delta^3$ acids weighing 0.41 g. was recovered from neutral and basic washes above. The nuclear magnetic resonance spectrum of the $\Delta^2$ ester product was consistent with the proposed structure.

*Analysis.*—Calculated for $C_{20}H_{24}N_2O_4S$ (percent): C, 61.84; H, 61.23; N, 7.21. Found (percent): C, 61.59; H, 61.23; N, 7.04.

Example 9

The acid chloride prepared from 1.75 g. of 7-(phenoxyacetamido)-3-methyl-$\Delta^3$-cephem-4-carboxylic acid was dissolved in 50 ml. of methylene chloride and the solution was added dropwise to a stirred solution of 3.2 g. of 3-methyl-1-butyn-3-ol which had been distilled from calcium hydride and 0.72 g. of triethylamine in 30 ml. of methylene chloride maintained at ice temperature. Upon the completion of the addition (2 hours) the solution was washed with water and 3 percent hydrochloric acid and evaporated to dryness. The residue was dissolved in ethyl acetate, the solution washed with 5 percent sodium bicarbonate and treated with activated charcoal. The mixture was filtered and the solvent evaporated to give 1.31 g. of the unsaturated ester which crystallized from ether as prisms melting at 92°–93° C. From the neutral and basic washes was recovered 0.45 g. of $\Delta^3$ and $\Delta^2$ acids. The nuclear magnetic resonance spectrum of the ester was consistent with the proposed structure.

*Analysis.*—Calculated for $C_{21}H_{22}N_2O_5S$ (percent): C, 60.86; H, 5.35; N, 6.76. Found (percent): C, 61.02; H, 5.59; N, 7.00.

Example 10

The acid chloride prepared from 1.75 g. of 7-(phenoxyacetamido)-3-methyl-$\Delta^3$-cephem - 4 - carboxylic acid was dissolved in 75 ml. of methylene chloride and the solution was added dropwise to a stirred solution of 0.72 g. of triethylamine and 0.70 g. of $\alpha$-hydroxyacetophenone (phenacyl alcohol) in 40 ml. of methylene chloride maintained at −75° C. The addition was completed in two hours and the organic solution was extracted successively with water and 3 percent hydrochloric acid and evaporated to dryness. The residue was dissolved in ethyl acetate. The solution was washed with 5 percent sodium bicarbonate solution and treated with activated charcoal. The mixture was then filtered and the solvent evaporated to give 1.28 g. of ester. The ester was crystallized from ethyl acetate to give a product with a melting point of 145°–146° C. The neutral and basic washes from above yielded 0.51 g. of mixture of acids. The nuclear magnetic resonance spectrum was consistent with the proposed structure for the $\Delta^2$ ester.

*Analysis.*—Calculated for $C_{24}H_{22}N_2O_6S$ (percent): C, 61.80; H, 4.75; N, 6.01. Found (percent): C, 62.06; H, 4.99; N, 6.14.

Example 11

The acid chloride from 1.75 g. of 7-(phenoxyacetamido)-3-methyl-$\Delta^3$-cephem-4-carboxylic acid was dissolved in 70 ml. of methylene chloride and the solution was added dropwise to a stirred solution of 0.72 g. of triethylamine and 4.0 g. of 3-methyl-1-buten-3-ol in 50 ml. of methylene chloride maintained at ice temperature. Upon completion of the addition (about 90 minutes) the organic solution was washed successively with water and 3 percent hydrochloric acid and evaporated to dryness. The residue was dissolved in ethyl acetate, washed with 5 percent sodium bicarbonate solution, and treated with activated charcoal. The mixture was filtered and the solvent was removed from the filtrate under reduced pressure to give 0.51 g. of crude ester. The neutral and basic washes yielded 0.82 g. of $\Delta^2$ and $\Delta^3$ acids. The nuclear magnetic resonance spectrum was consistent with the proposed structure for the $\Delta^2$ ester.

Example 12

The acid chloride prepared from 3.50 g. of 7-(phenoxyacetamido)-3-methyl-$\Delta^3$-cephem-4-carboxylic acid was dissolved in 100 ml. of methylene chloride and the solution was added dropwise to a stirred solution of 5.5 g. of pinacol and 1.3 g. of triethylamine in 50 ml. of methylene chloride maintained at ice temperature. The addition was completed in two hours and the solution was then washed successively with water and 3 percent hydrochloric acid and evaporated to dryness. The residue was dissolved in ethyl acetate, and the solution was washed successively with 5 percent sodium bicarbonate solution and water, and dried over sodium sulfate. The solvent was removed by evaporation and gave 3.8 g. of crude ester. The nuclear magnetic resonance spectrum of the product was consistent with a monopinacol ester having the double bond in the $\Delta^2$ position.

Example 13

The acid chloride prepared from 1.0 g. of 7-(phenoxyacetamido)-3-methyl-$\Delta^3$-cephem-4-carboxylic acid was dissolved in 100 ml. of methylene chloride and the solution added dropwise to a stirred solution of 0.630 g. of benzhydrol and 0.400 g. of triethylamine in 50 ml. of methylene chloride maintained at ice temperature. Upon completion of the addition the solution was washed successively with water and 3 percent hydrochloric acid and evaporated to dryness. The residue was dissolved in ethyl acetate. The solution was washed with 10 percent sodium bicarbonate and treated with activated charcoal. The mixture was filtered and the filtrate was evaporated to dryness to give 0.604 g. of ester. The ester was recrystallized from ether as needles having a melting point of 109°–112° C. The nuclear magnetic resonance spectrum substantiated the proposed structure of the $\Delta^2$-cephem carboxylic acid ester.

Analysis.—Calculated for $C_{29}H_{26}N_2O_5S$ (percent): C, 67.69; H, 5.09; N, 5.45. Found (percent): C, 67.82; H, 5.18; N, 5.59.

Example 14

The acid chloride prepared from 1.75 g. of 7-(phenoxyacetamido-3-methyl-$\Delta^3$-cephem-4-carboxylic acid was dissolved in 70 ml. of methylene chloride and the solution was added dropwise to a cooled (ice temperature) solution of 3.7 g. of t-amyl alcohol and 0.60 g. of triethylamine in 30 ml. of methylene chloride. The addition was completed in two hours. The reaction mixture was washed successively with water and 3 percent hydrochloric acid and evaporated to dryness. The residue was dissolved in ethyl acetate and the solution was washed with 5 percent sodium bicarbonate and treated with activated charcoal. The mixture was filtered and the filtrate evaporated to dryness to give 1.52 g. of the $\Delta^2$ ester.

Example 15

The acid chloride obtained from 1.0 g. of 7-(phenoxyacetamido)-3-methyl-$\Delta^3$-cephem-4-carboxylic acid was dissolved in 100 ml. of methylene chloride and the solution was added dropwise to a stirred solution of 0.400 g. of triethylamine and 0.530 g. of p-nitrobenzyl alcohol in 50 ml. of methylene chloride maintained at $-75°$ C. Upon completion of the addition the solution was washed successively with water and 3 percent hydrochloric acid and evaporated to dryness. The residue was dissolved in ethyl acetate and the solution washed with 5 percent sodium bicarbonate solution and treated with activated charcoal. The mixture was filtered and the solvent was removed from the filtrate under reduced pressure to give 0.30 g. of the ester. The ester crystallized from ethyl acetate as needles melting at 134°–136° C. The nuclear magnetic resonance spectrum confirmed the proposed $\Delta^2$ ester structure.

Analysis.—Calculated for $C_{23}H_{20}N_3O_7S$ (percent): C, 57.25; H, 4.18; N, 8.70. Found (percent): C, 57.10; H, 4.46; N, 8.45.

Example 16

The acid chloride prepared from 1.0 g. of 7-(thiopheneacetamido)-3-acetoxymethyl-$\Delta^3$-cephem-4-carboxylic acid was dissolved in 100 ml. of methylene chloride and the solution was added dropwise to a stirred solution of 0.360 g. of triethylamine and 1.86 g. of t-butyl alcohol in 30 ml. of methylene chloride maintained at ice temperature. The addition was completed in one hour and the solution was then washed successively with water and 3 percent hydrochloric acid and evaporated to dryness. The residue was dissolved in ethyl acetate and the solution was washed with 5 percent sodium bicarbonate and treated with activated charcoal. The mixture was filtered and the solvent removed from the filtrate under reduced pressure to give 0.860 g. of crude ester which crystallized from ethyl acetate and had a melting point of 178°–180° C. The nuclear magnetic resonance spectra was consistent with the proposed $\Delta^2$ ester structure.

Analysis.—Calculated for $C_{20}H_{24}N_2O_6$ (percent): C, 53.09; H, 5.35; N, 6.19. Found (percent): C, 53.08; H, 5.33; N, 6.11.

Example 17

The acid chloride prepared from 0.700 g. of 7-(phenoxyacetamido) - 3 - methyl-$\Delta^3$-cephem-4-carboxylic acid was dissolved in 20 ml. of alcohol-free chloroform and the solution was added dropwise to a stirred solution of 0.300 g. of anisyl alcohol (p-methoxybenzyl alcohol) and 0.300 g. of triethylamine in 10 ml. of chloroform maintained at $-75°$ to $-50°$ C. The addition was completed in about one hour and the solution was then washed successively with water and 3 percent hydrochloric acid and evaporated to dryness. The residue was dissolved in ethyl acetate. The solution was washed with 5 percent sodium bicarbonate solution, dried over sodium sulfate, and evaporated to dryness to give 1.02 g. of ester product which crystallized from carbon tetrachloride as needles melting at 108°–110° C. The nuclear magnetic resonance spectrum verified the proposed $\Delta^2$ ester structure.

Example 18

The acid chloride from 2.0 g. of 7-(phenoxyacetamido)-3-methyl-$\Delta^3$-cephem-4-carboxylic acid was dissolved in 75 ml. of methylene chloride and the solution was added dropwise to a stirred solution of 3.48 g. of isopropyl alcohol and 0.82 g. of triethylamine in 30 ml. of methylene chloride maintained at $-30°$ C. The addition was completed in 105 minutes and the solution was then washed successively with water and 3 percent hydrochloric acid and evaporated to dryness. The residue was dissolved in ethyl acetate and the solution was washed with 5 percent sodium bicarbonate solution and treated with activated charcoal. The mixture was filtered and the solvent was removed from the filtrate under reduced pressure to give 0.910 g. of the ester. The ester crystallized from ether as needles melting at 61°–64° C. The nuclear magnetic resonance spectrum was consistent with the proposed $\Delta^2$ ester structure.

Analysis.—Calculated for $C_{19}H_{22}N_2O_5S$ (percent): C, 58.45; H, 5.68; N, 7.18. Found (percent): C, 58.49; H, 5.88; N, 6.96.

Example 19

The acid chloride from 1.73 g. of 7-(phenoxyacetamido)-3-methyl-$\Delta^3$-cephem-4-carboxylic acid was dissolved in 100 ml. of methylene chloride and the solution was added dropwise to a stirred solution of 0.720 g. of triethylamine and 0.760 g. of adamantan-1-ol in 40 ml. of methylene chloride maintained at ice temperature. The addition was completed in two hours, and the solution was washed successively with water and 3 percent hydrochloric acid and evaporated to dryness. The residue was dissolved in ethyl acetate, and solution was washed with 10 percent sodium bicarbonate solution, and treated with activated charcoal. The mixture was filtered and the filtrate evaporated to dryness to give 0.41 g. of the Δ² ester. The nuclear magnetic resonance spectrum verified the proposed structure.

EXAMPLE 20

The acid chloride from 1.73 g. of 7-(phenoxyacetamido)-3-methyl-Δ³-cephem-4-carboxylic acid was dissolved in 50 ml. of tetrahydrofuran and the solution was added dropwise to a stirred solution of 0.72 g. of triethylamine and 0.890 g. of N-hydroxymethylphthalimide in 30 ml. of tetrahydrofuran maintained at —75° C. The addition was completed in two hours and the solvent was then removed under reduced pressure. The residue was suspended in methylene chloride and the suspension was washed successively with water and 3 percent hydrochloric acid and evaporated to dryness. The residue from this evaporation was dissolved in ethyl acetate and the solution washed with 10 percent sodium bicarbonate solution and treated with activated charcoal. The mixture was filtered and the filtrate evaporated to give 0.710 g. of crude ester. The ester crystallized from ethyl acetate with a melting point of 170°–173° C. The nuclear magnetic resonance spectrum confirmed the proposed Δ² ester structure.

As noted earlier Δ² esters wherein the ester group may be easily removed are of particular interest. These easily removable ester groups protect the carboxyl group during chemical modification of the remainder of the molecule yet allow easy regeneration of the free carboxyl group which appears to be essential to biological activity. Of particular interest are those esters derived from p-nitrobenzyl alcohol, 3-methyl-1-butyn-3-ol, and 3-methyl-1-buten-3-ol. These novel esters are those having one of the following structures:

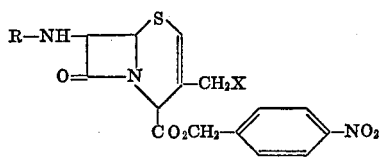

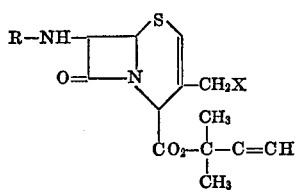

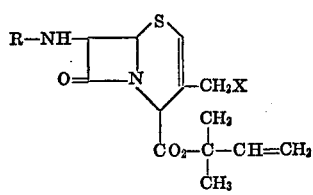

wherein R and X have the values assigned above.

The p-nitrobenzyl esters and the allylic esters may be easily cleaved directly to the free acid. The acetylenic esters on the other hand have the unique property of being quite stable; however, when partially reduced to the allylic ester they are readily cleaved. Thus, an acetylenic ester may be subjected to a number of chemical reactions without fear of cleavage of the ester, but when cleavage is desired, it may be reduced to the allylic ester which is readily cleaved.

I claim:
1. A method for the preparation of a Δ²-cephem-4-carboxylic acid ester having the formula

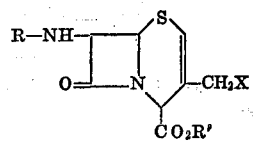

which comprises:
(A) converting a Δ³-cephem-4-carboxylic acid having the formula

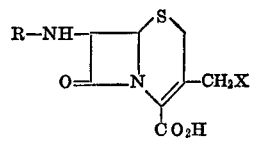

to the corresponding acid chloride; and
(B) treating the acid chloride with 1–2 moles of a tertiary amine base having a pKa within the range of 7–11 and 1–10 moles of an ester-forming aliphatic alcohol having the formula R'OH at a temperature within the range of —100° to +50° C.; wherein
X is hydrogen or acetoxy,
R is an amino protecting group, and
R' is the portion of an ester-forming aliphatic alcohol that remains after removal of the hydroxyl group.

2. A method as in claim 1 wherein from 1.2 to 1.3 moles of the tertiary amine base are employed.

3. A method as in claim 1 wherein the tertiary amine base is one having a pKa within the range of 9–11.

4. A method as in claim 3 wherein the tertiary amine base is triethylamine.

5. A method as in claim 4 wherein from 1.2 to 1.3 moles of triethylamine are employed.

6. A Δ² - cephem-4-carboxylic acid ester having the formula

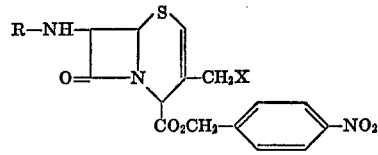

wherein X is hydrogen or acetoxy and R is an amino protecting group.

7. A Δ²-cephem - 4 -carboxylic acid ester having the formula

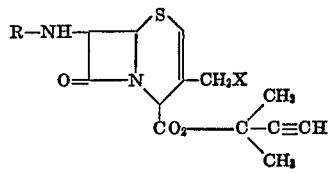

wherein X is hydrogen or acetoxy and R is an amino protecting group.

8. A Δ² - cephem-4-carboxylic acid ester having the formula
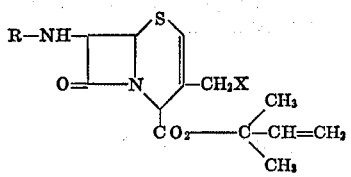
wherein X is hydrogen or acetoxy and R is an amino protecting group.
References Cited
UNITED STATES PATENTS
3,578,660  5/1971  Cooper _____ 260—243 C
3,637,678  1/1972  Webber et al. _____ 260—243 C
NICHOLAS S. RIZZO, Primary Examiner
U.S. Cl. X.R.
424—246